US007387416B2

(12) United States Patent
Tsukamoto et al.

(10) Patent No.: US 7,387,416 B2
(45) Date of Patent: Jun. 17, 2008

(54) VEHICULAR ILLUMINATION LAMP WITH PRIMARY AND SECONDARY LIGHT SOURCES

(75) Inventors: Michio Tsukamoto, Shizuoka (JP); Hiroyuki Ishida, Shizuoka (JP); Kiyoshi Sazuka, Shizuoka (JP); Masashi Tatsukawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 11/294,444

(22) Filed: Dec. 6, 2005

(65) Prior Publication Data

US 2006/0120094 A1 Jun. 8, 2006

(30) Foreign Application Priority Data

Dec. 7, 2004 (JP) .......................... P.2004-354252

(51) Int. Cl.
*F21V 7/09* (2006.01)
*B60Q 1/16* (2006.01)
*F21S 8/12* (2006.01)

(52) U.S. Cl. ...................... 362/518; 362/247; 362/297; 362/346; 362/507; 362/517; 362/538; 362/545

(58) Field of Classification Search ................ 362/518, 362/543, 544, 545, 517, 538, 507, 247, 297, 362/346
See application file for complete search history.

(56) References Cited

U.S. PATENT DOCUMENTS 6,578,997 B2 * 6/2003 Futami ....................... 362/522
6,948,836 B2 * 9/2005 Ishida et al. ................ 362/516
7,156,544 B2 * 1/2007 Ishida ........................ 362/538
2002/0118548 A1 * 8/2002 Kuenstler et al. ........... 362/518
2003/0072167 A1 * 4/2003 Albou ........................ 362/543
2005/0083686 A1 * 4/2005 Yatsuda et al. ............. 362/230
2006/0039157 A1 * 2/2006 Sormani et al. ............ 362/518

FOREIGN PATENT DOCUMENTS

JP 2003-317513 A 11/2003

* cited by examiner

*Primary Examiner*—Y M. Lee
*Assistant Examiner*—Leah S Lovell
(74) *Attorney, Agent, or Firm*—Sughrue Mion, PLLC

(57) ABSTRACT

An illumination lamp including a projection lens 12 and primary and secondary light source units 14, 16 are disposed rearwards of a projection lens 12 disposed on an optical axis Ax, which extends in a longitudinal direction of a lamp. The primary light source unit 14 includes a primary reflector 34 and an upwardly oriented reflecting surface **36*a* which extends rearwards from the rear focal point F of the projection lens 12. The secondary light source unit 16 includes a secondary reflector 44 that reflects light upwards so as to be caused to substantially converge on a location lying near the rear focal point F on a downwardly oriented reflecting surface 46*a*, which extends obliquely downwards from a front end edge of the upwardly oriented reflecting surface 36*a*** towards a rear of the lamp.

6 Claims, 8 Drawing Sheets

VEHICULAR ILLUMINATION LAMP WITH PRIMARY AND SECONDARY LIGHT SOURCES

This application claims foreign priority from Japanese Patent Application No. 2004-354252, filed Dec. 7, 2004, the entire disclosure of which is herein incorporated by reference.

BACKGROUND OF THE INVENTION

1. Field of the Invention

The present invention relates to a vehicular illumination lamp which utilizes a light emitting device as a light source.

2. Related Art

In recent years, vehicular illumination lamps, which utilizes light emitting devices such as light emitting diodes as light sources, have been proposed for use as headlamps or the like.

For example, Japanese Patent Publication No. 2003-317513 ("JP '513") describes a so-called projector type vehicular illumination lamp, which includes a projection lens disposed on an optical axis that extends in a longitudinal direction of the lamp and a light source unit disposed rearwards of the projection lens. The light source unit described in JP '513 is configured so as to include a light emitting device disposed near the optical axis at a position situated further rearwards than a rear focal point of the projection lens, a reflector disposed in such a manner as to cover the light emitting device from thereabove so as to reflect light from the light emitting device towards a front of the lamp while causing the light to get closer to the optical axis, and a mirror member having an upwardly oriented reflecting surface, which extends rearwards substantially along the optical axis from near the rear focal point so as to reflect part of reflected light from the reflector upwards. Then, a light distribution pattern having a cut-off line as an inversely projected image of a front end edge of the upwardly oriented reflecting surface at an upper end thereof is formed when the light source unit is turned on.

When using a lamp configuration such as that described in the aforesaid JP '513, it is possible to form a light distribution pattern having a clear cut-off line at an upper end portion thereof while enhancing the utilization factor of a bundle of rays of light from a light emitting device.

In such a lamp configuration, however, since only a light distribution having a cut-off line can be formed, the lamp configuration is only suitable for a lamp for forming a lower beam light distribution pattern of a headlamp. Accordingly, it is necessary to provide another separate vehicular illumination lamp in order to form a upper beam light distribution pattern for the headlamp.

In addition, if a vehicular illumination lamp that which utilizes a light emitting device as a light source, is used as a headlamp, it is preferable to use a plurality of such vehicular illumination lamps in order to provide a predetermined brightness. However, in the event that the vehicular illumination lamps so used have different lamp configurations for lower beam and upper beam, there is a problem that many vehicular illumination lamps are needed to meet the requirements.

The invention was made in the light of these situations, and an object thereof is to provide a vehicular illumination lamp utilizing a light emitting device as a light source which can form a light distribution pattern having a cut-off line at an upper end portion thereof and another light distribution pattern which spreads on an upper side of the cut-off line while enhancing the utilization factor of a bundle of rays of light from the light emitting device.

SUMMARY OF THE INVENTION

The invention a lamp configuration including primary and secondary light source units disposed rearwards of a projection lens. Namely, according to the invention, a vehicular illumination lamp includes a projection lens disposed on an optical axis that extends in a longitudinal direction of the lamp, and primary and secondary light source units that are disposed rearwards of the projection lens.

The primary light source unit includes a primary light emitting device disposed near the optical axis at a position situated further rearwards than a rear focal point of the projection lens, a primary reflector disposed in such a manner as to cover the primary light emitting device from thereabove so as to reflect light from the primary light emitting device towards a front of the lamp while causing the light to get closer to the optical axis, and a primary mirror member having an upwardly oriented reflecting surface which extends rearwards from near the rear focal point substantially along the optical axis so as to reflect upwards part of reflected light from the primary reflector.

The secondary light source unit includes a secondary mirror member having a downwardly oriented reflecting surface which extends obliquely downwardly from a front end edge of the upwardly oriented reflecting surface towards a rear of the lamp, a secondary light emitting device disposed below the optical axis, and a secondary reflector adapted to reflect upwards light from the secondary light emitting device so as to cause the light so reflected to substantially converge on a location on the downwardly oriented reflecting surface which lies near the rear focal point.

There is no specific limitation on the type of the vehicular illumination lamp, and hence the vehicular illumination lamp can be adopted as, for example, a headlamp, a fog lamp, a cornering lamp, a daytime running lamp, or as a lamp unit that includes these lamps.

The light emitting device can be a device-like light source having a light emitting chip, which emits light substantially in the form,of a spot, and there is no specific limitation on the type thereof. For example, light emitting diodes, laser diodes and the like can be adopted.

BRIEF DESCRIPTION OF THE DRAWINGS

The advantages, nature and various additional features of the invention will appear more fully upon consideration of the exemplary embodiment of the invention, which is schematically set forth in the drawings, in which;

FIG. 3 is a side sectional view which shows the vehicular illumination lamp while paying attention to an optical path resulting when a primary light source unit is turned on.

FIG. 4 is a side sectional view which shows the vehicular illumination lamp while paying attention to an optical path resulting when a secondary light source unit is turned on.

DESCRIPTION OF THE EXEMPLARY EMBODIMENT

Although the invention will be described below with reference to an exemplary embodiment and modification thereof, the following exemplary embodiment and modifications do not restrict the invention.

Figure 1:
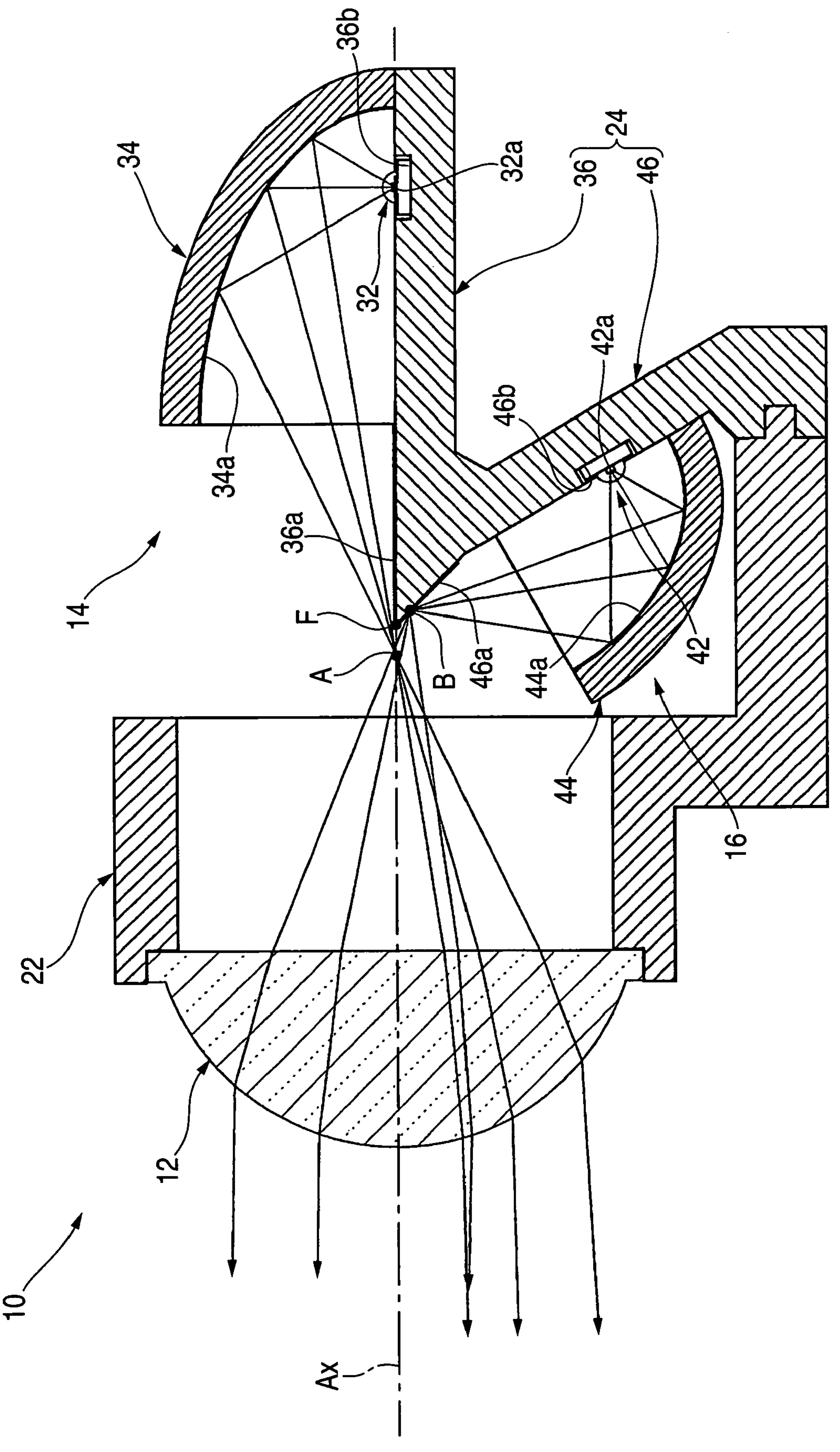
FIG. 1 is a side sectional view which shows a vehicular illumination lamp according to an exemplary embodiment of the invention.
Figure 2:
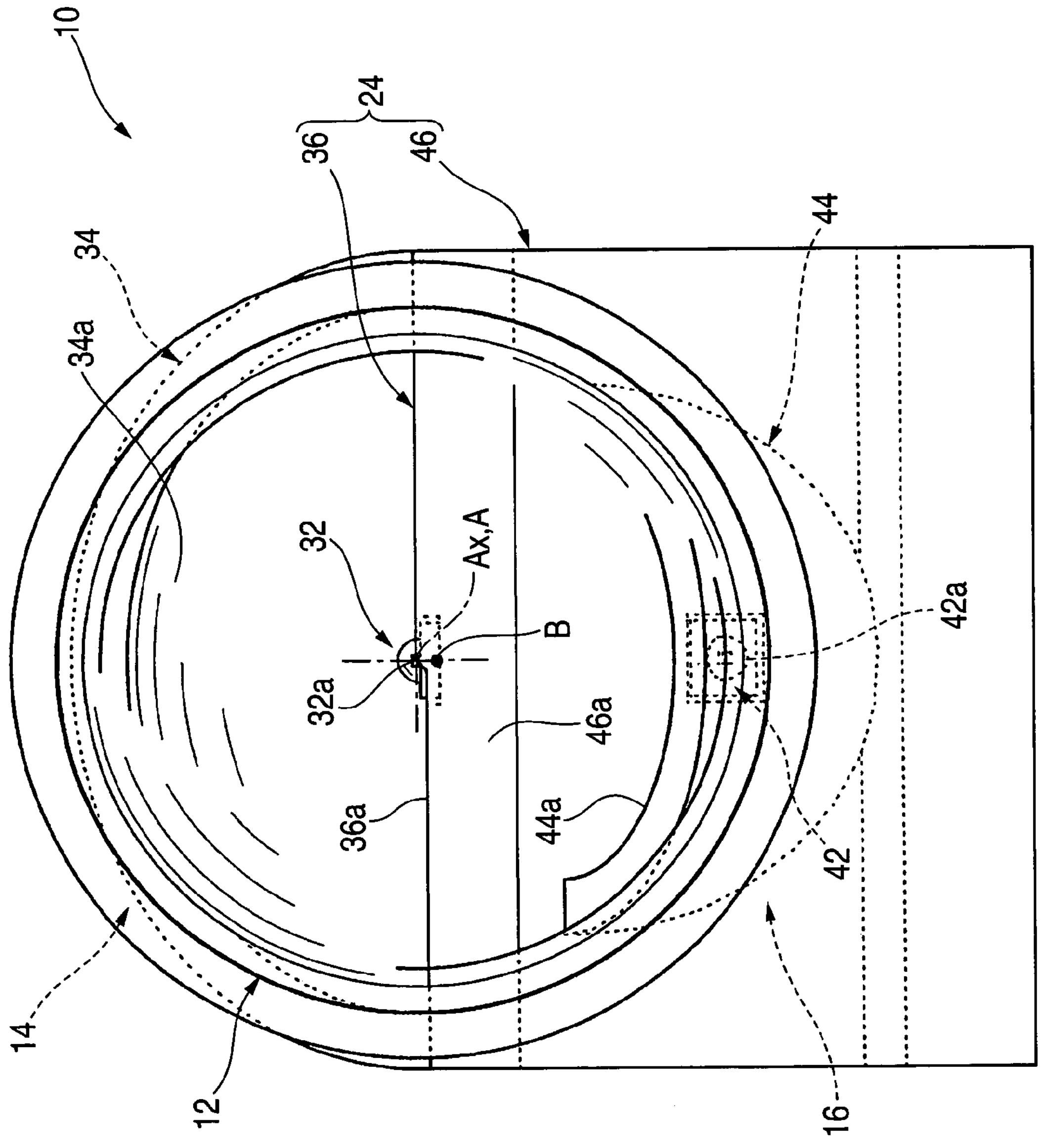
FIG. 2 is a front view which shows the vehicular illumination lamp.

FIG. 1 is a side sectional view which shows a vehicular illumination lamp 10 according to an exemplary embodiment of the invention, and FIG. 2 is a front view thereof.

As shown in these figures, the vehicular illumination lamp 10 includes a projection lens 12 disposed on an optical axis Ax that extends in a longitudinal direction of the lamp and primary and secondary light sources 14, 16, which are disposed rearwards of the projection lens 12.

This vehicular illumination lamp 10 is a lamp unit which is incorporated as part of a headlamp. When incorporated in the headlamp, the vehicular illumination lamp 10 is disposed in such a state that the optical axis Ax thereof extends in a downward direction at an angle of about 0.5 to 0.6° relative to a longitudinal direction of a vehicle.

The projection lens 12 is supported on a lens holder 22, and the primary and secondary light source units 14, 16 are supported on a light source unit holder 24. Then, the lens holder 22 and the light source unit holder 24 are fixedly connected to each other below the optical axis Ax.

The projection lens 12 is made up of a planoconvex lens, which is a lens for which a front surface is convex and a rear surface is planar. The projection lens 12 is adapted to project an image on a focal plane on to an imaginary vertical screen ahead of the lamp as an inverted image thereof. The projection lens 12 includes a rear focal point F.

Figure 3:
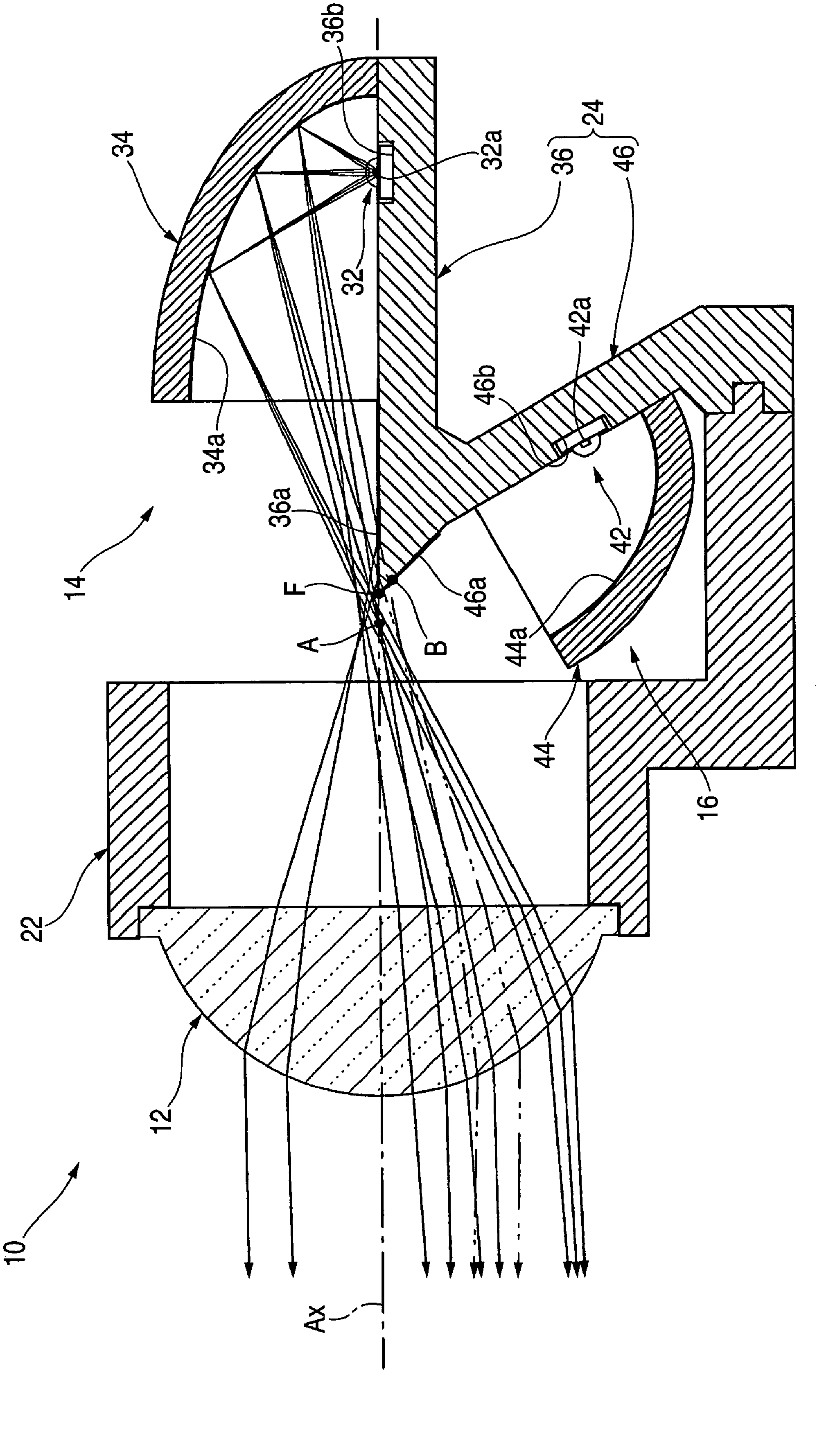

FIG. 3 is a side sectional view which shows the vehicular illumination lamp 10, while paying attention to an optical path resulting when the primary light source unit 14 is turned on. As shown in FIG. 3, the primary light source unit 14 includes a primary light emitting device 32, a primary reflector 34, and a primary mirror member 36. The primary light emitting device 32 is disposed on the optical axis Ax at a position situated further rearwards than a rear focal point F of the projection lens 12. The primary reflector 34 disposed in such a manner as to cover the primary light emitting device 32 from above. The primary reflector 34 reflects light from the primary light emitting device 32 towards a front of the lamp while causing the light to get closer to the optical axis Ax. A primary mirror member 36 has an upwardly oriented reflecting surface 36*a*, which extends rearwards from the position of the rear focal point F along the optical axis Ax so as to reflect part of reflected light from the primary reflector 34 upwards. In this case, the primary mirror member 36 is part of the light source unit holder 24.

The primary light emitting device 32 is a while light emitting diode having a square light emitting chip 32*a* of a size of about 0.3 to 3 $mm^2$ and is fixedly positioned on a light-source support recess portion 36*b* formed in an upper surface, which extends rearwards from the upwardly oriented reflecting surface 36*a* of the primary mirror member 36, so that the light emitting chip 32 thereof is disposed so as to be oriented vertically upwards on the optical axis Ax.

A reflecting surface 34*a* of the primary reflector 34 is made up of a substantially ellipsoidal surface, which has a major axis that is coaxial with the optical axis Ax and takes a light emitting center of the primary light emitting device 32 as a primary focal point thereof. In this case, the reflecting surface 34*a* is set such that a vertical sectional shape thereof, which extends along the optical axis Ax, becomes an elliptic shape that takes as a secondary focal point a point A which lies slightly further forwards than the rear focal point F and also is set such that the eccentricity thereof gradually increases from a vertical section to a horizontal section. Accordingly, the primary reflector 34 is adapted not only to cause light from the primary light emitting device 32 to converge on the point A within the vertical section but also to move the converging position rather forwards within the horizontal section. This primary reflector 34 is fixed to the upper surface of the primary mirror member 36 at a lower end portion of a circumferential edge of the reflecting surface 34*a*.

The upwardly oriented reflecting surface 36*a* of the primary mirror member 36 is formed by applying a planishing treatment to the upper surface of the primary mirror member 36. The planishing treatment includes the deposition or spray of aluminum to provide a mirror reflection effect. In this upwardly oriented reflecting surface 36*a*, a left-hand side area, which lies further leftwards than the optical axis Ax, is made up of a horizontal plane including the optical axis Ax, whereas a right-hand side area which lies further rightwards than the optical axis Ax is made up of a horizontal plane which is made lower by one step than the left-hand side area via a short slope. Then, a front end edge of the upwardly oriented reflecting surface 36*a* is formed in such a manner as to extend along the focal plane including the rear focal point F. As shown in FIG. 3, the primary mirror member 36 is configured to reflect part of reflected light traveling from the reflecting surface 34*a* of the primary reflector 34 toward the projection lens 12 from the upwardly oriented reflecting surface 36*a* thereof. This causes the part of the reflected light so reflected to be incident on the projection lens 12, so as to cause the light incident on the projection lens 12 to emerge therefrom as a downwardly oriented light.

Figure 4:
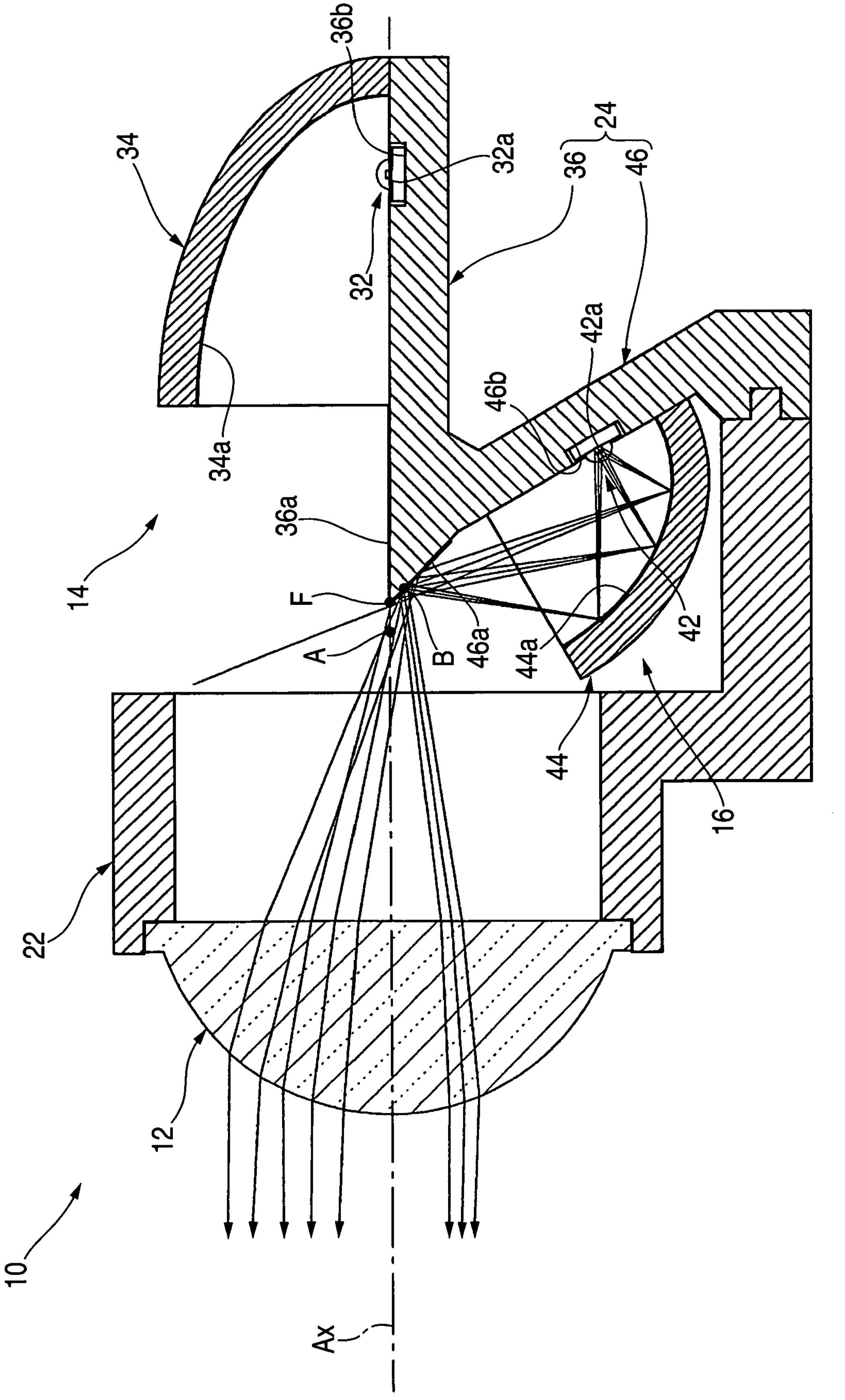

FIG. 4 is a side sectional view which shows the vehicular illumination lamp 10 by paying attention to an optical path resulting when the secondary light source unit 16 is turned on.

As shown in FIG. 4, the secondary light source unit 16 includes a secondary mirror member 46, a secondary light emitting device, and a secondary reflector 44. The secondary mirror member 46 has a downwardly oriented reflecting surface 46*a*, which extends obliquely downwardly from the front end edge of the upwardly oriented reflecting surface 36*a* of the primary mirror member 36 towards a rear of the lamp. The secondary light emitting device 42 is disposed below the optical axis Ax. The secondary reflector 44 is adapted to reflect light from the secondary light emitting device 42 upwards so as to cause the light so reflected to substantially converge on a point B on the downwardly oriented reflecting surface 46*a*, which lies slightly obliquely below and further rearwards than the rear focal point F. In this case, the secondary mirror member 46 is also a part of the light source unit holder 24.

The configuration of the secondary light emitting device 42 is similar to that of the primary light emitting device 32.

The secondary light emitting device 42 is fixedly positioned in a light source support recess portion 46*b* formed on a downward slope, which extends obliquely downwards from a lower end edge of the downwardly oriented reflecting surface 46*a* of the secondary mirror member 46. A light emitting chip 42*a* thereof is disposed in such a manner as to be oriented obliquely downwardly at a position lying further rearwards to the rear of the lamp than the rear focal point F and obliquely below the rear focal point F.

The reflecting surface 44*a* of the secondary reflector 44 is made up of a substantially ellipsoidal surface which has a major axis on a straight line which connects a light emitting center of the secondary light emitting device 42 with the point B and the substantially ellipsoidal surface takes, as a primary focal point, the light emitting center of the secondary light emitting device 42. In this case, the reflecting surface 44*a* is set such that a vertical sectional shape thereof, which extends along the major axis, becomes an elliptic shape that takes the point B as a secondary focal point and also is set such that the eccentricity thereof gradually increases from a vertical section towards the left and right thereto. Therefore, the secondary reflector 44 not only causes light from the secondary light emitting device 42 to converge on the point B with respect to a vertical direction, but also reduces the degree of convergence with respect to a horizontal direction. This secondary reflector 44 is fixed to the downward slope of the secondary mirror member 46 at a rear end portion of a circumferential edge of the reflecting surface 44*a*.

The downwardly oriented reflecting surface 46*a* of the secondary mirror member 46 is made up of a plane which is inclined through an angle of about 45° relative to a horizontal plane containing the optical axis Ax. Accordingly, as shown in FIG. 4, the secondary mirror member 46 reflects forwards most of reflected light from the reflecting surface 44*a* of the secondary reflector 44 on the downwardly oriented reflecting surface 46*a* thereof so as to cause the light so reflected to be incident on the projection lens 12. Note that a mounting surface of the secondary reflector 44 on the secondary mirror member 46 is formed into the shape of a plane which inclines at a larger inclination angle (for example, on the order of 60°) than the downwardly oriented reflecting surface 46*a*.

Figure 5:
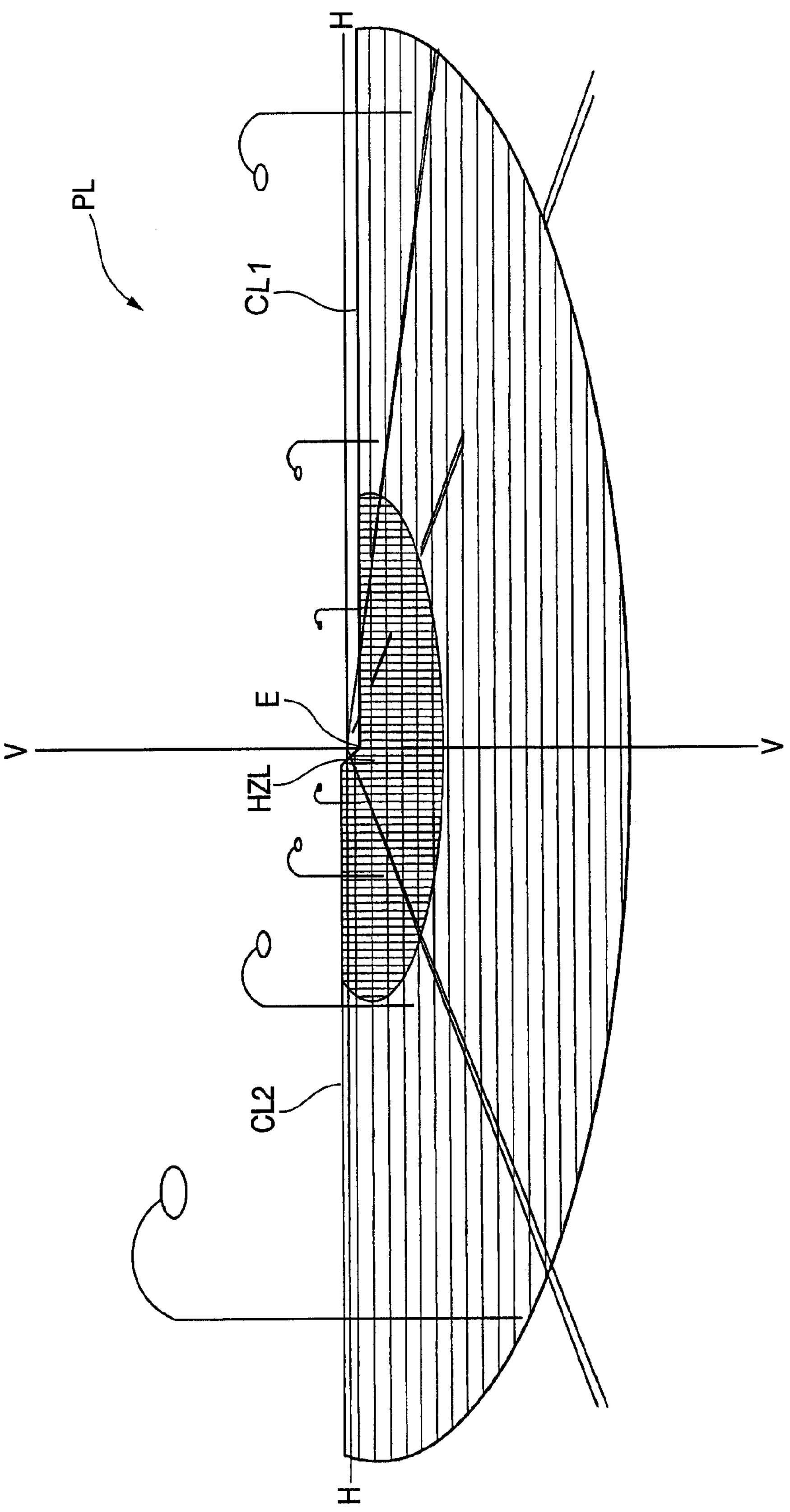
FIG. 5 is a perspective view of a lower beam light distribution pattern that is to be formed by light emitted forwards from the vehicular illumination lamp on an imaginary vertical screen disposed 25 m ahead of a vehicle.
Figure 6:
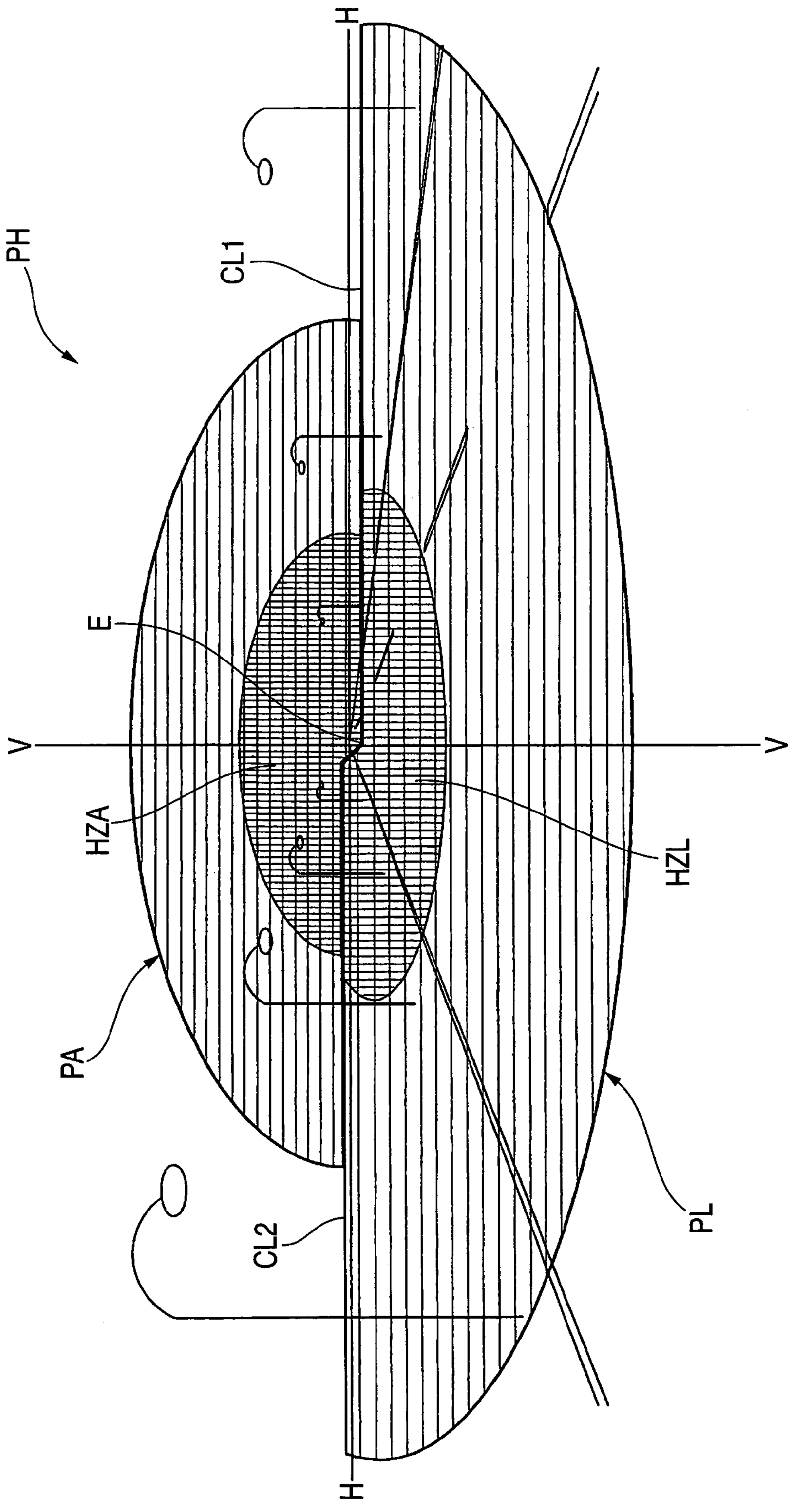
FIG. 6 is a perspective view of a upper beam light distribution pattern that is to be formed by light emitted forwards from the vehicular illumination lamp on the imaginary vertical screen disposed 25 m ahead of the vehicle.

FIGS. 5 and 6 are perspective views of light distribution patterns, which are formed by light emitted forwards from the vehicular illumination lamp 10 on an imaginary vertical screen disposed 25 m ahead of the vehicle. FIG. 5 shows a lower beam light distribution pattern PL, and FIG. 6 shows a upper beam light distribution pattern PH.

The lower beam light distribution pattern PL shown in FIG. 5 is designed to be formed when the primary light source unit 14 is turned on.

This lower beam light distribution pattern PL is a lower beam light distribution pattern for the left-hand side traffic where vehicles are driven on the left-hand side of the road and has at an upper end portion thereof cut-off lines CL1, CL2 which are aligned transversely while being staggered vertically in a step-like fashion. These cut-off lines CL1, CL2 extend transversely horizontally while being staggered vertically along a V-V line, as a boundary, which passes vertically through an H-V point, which is a vanishing point lying in a forward direction of the lamp. A portion lying further rightwards than the V-V line, which illuminates a lane for oncoming vehicles is formed as a lower cut-off line CL1. A portion lying further leftwards than the V-V line, which illuminates a lane for the subject vehicle, is formed as an upper cut-off line CL2, which is raised from the lower cut-off line CL1 to a higher level via an inclined portion.

This lower beam light distribution pattern PL is made by projecting an image of the primary light emitting element 32 that is formed on the rear focal plane of the projection lens 12 by light from the primary light emitting device 32 that is reflected on the primary reflector 34 on to the imaginary vertical screen as an inversely projected image thereof by the projecting lens 12, and the cut-off lines CL1, CL2 thereof are made to be formed as an inversely projected image of the front end edge of the upwardly oriented reflecting surface 36*a* of the primary mirror member 36.

While the cut-off lines CL1, CL2 are formed as the inversely projected image of the front end edge of the upwardly oriented reflecting surface 36*a* of the primary mirror member 36, there is no specific limitation on a specific shape of the cut-off line, and hence, it is possible to adopt a shape comprising a horizontal cut-off line, which extends in a horizontal direction and an inclined cut-off line which extends obliquely upwards from the horizontal cut-off line, or a shape comprising a pair of left and right cut-off lines which are vertically staggered to form steps.

In this lower beam light distribution pattern PL, an elbow point E, which is an intersection point between the lower cut-off line CL1 and the V-V line, lies below the H-V point by an angle of about 0.5 to 0.6°. This is because the optical axis Ax extends in the downward direction at the angle of about 0.5 to 0.6° relative to the longitudinal direction of the vehicle. Then, in the lower beam light distribution pattern PL, a hot zone HZL, which constitutes a high luminous intensity area, is formed in such a manner as to surround the elbow point E.

The upper beam light distribution pattern PH shown in FIG. 6 is designed to be formed when the primary and secondary light source units are turned on at the same time.

This upper beam light distribution pattern PH is designed to be formed as a composite light distribution pattern of the lower beam light distribution pattern PL and an additional upper beam forming light distribution pattern PA which spreads upwards from the cut-off lines CL1, CL2 of the lower beam light distribution pattern PL.

The additional upper beam forming light distribution pattern PA is formed as a light distribution pattern which is brighter but smaller than the lower beam light distribution pattern PL, and a lower end portion thereof is formed in such a manner as to extend along the cut-off lines CL1, CL2. Then, in this additional upper beam forming light distribution pattern PA, a hot zone HZA, which constitutes a high luminous intensity area, is formed in such a manner as to surround the elbow point E. In addition, a hot zone for the upper beam light distribution pattern PH is designed to be made up of the hot zone HZA and the hot zone HZL for the lower beam light distribution pattern PL.

The reason why the additional upper beam forming light distribution pattern PA is formed as the light distribution pattern, which is brighter but smaller than the lower beam light distribution pattern PL, is because light from the secondary light emitting device 42 that is reflected on the secondary reflector 44 is reflected forward on the downwardly oriented reflecting surface 46*a* of the secondary mirror member 46 to thereby pass the rear focal plane of the projection lens 12 at the position near the rear focal point F of the projection lens 12. In addition, the reason why the lower end portion of the additional upper beam forming light distribution pattern PA is formed in such a manner as to extend along the cut-off lines CL1, CL2 is because the downwardly oriented reflecting surface 46*a* of the secondary mirror member 46 extends obliquely downwardly from the front end edge of the upwardly oriented reflecting surface 36*a* of the primary mirror member 36 towards the rear of the lamp.

Note that when the vehicular illumination lamp 10 according to the exemplary embodiment of the invention is incorporated in an actual headlamp, a plurality of such vehicular illumination lamps 10 will be incorporated therein. Therefore, a plurality of lower beam light distribution patterns PL and upper beam light distribution patterns PH which are shown, respectively, in FIGS. 5 and 6 are to be formed in a superposed fashion as a lower beam light distribution pattern and a upper beam light distribution pattern of the whole of the headlamp.

Thus, an exemplary embodiment of the invention has been described in detail heretofore. The following functions and advantages can be obtained by the exemplary embodiment.

Namely, when the primary light source unit 14 is turned on, there can be formed the lower beam light distribution pattern PL having at the upper end portion thereof the clear cut-off lines CL1, CL2 as the inversely projected image of the front end edge of the upwardly oriented reflecting surface 36*a* of the primary mirror member 36. In addition, when the secondary light source unit 16 is turned on, there can be formed the additional upper beam forming light distribution pattern PA on the upper side of the cut-off lines CL1, CL2. Then, the upper beam light distribution pattern PH can be formed by turning on the primary and secondary light source units 14, 16 at the same time.

By adopting this configuration, when using this vehicular illumination lamp 10 as a lamp unit for a headlamp, the required number of lamp units can be reduced. Namely, the required number of lamp units can be suppressed to one-half of a required number of lamp units resulting from a case where a lower beam lamp unit and a upper beam lamp unit are configured as separate lamp units, while securing substantially the same brightness as one resulting from the case.

As this occurs, in the secondary light source unit 16, the downwardly oriented reflecting surface 46*a* of the secondary mirror member 46 is formed in such a manner as to extend obliquely downwards from the front end edge of the upwardly oriented reflecting surface 36*a* of the primary mirror member 36 towards the rear of the lamp, light from the secondary light emitting device 42 disposed below the optical axis can be reflected upwards by the secondary reflector 44 so as to be caused to substantially converge on the point B on the downwardly oriented reflecting surface 46*a* of the secondary mirror member 46 which lies near the rear focal point F of the projection lens 12, so that reflected light from the downwardly oriented reflecting surface 46*a* can be made to pass through the rear focal plane of the projection lens 12 at the position near and below the rear focal point F of the projection lens 12. Therefore, much of light from the secondary light emitting device 42 can be made to be incident on the projection lens 12 with good efficiency.

Thus, according to the exemplary embodiment of the invention, the vehicular illumination lamp 10 utilizes the light emitting devices 32, 42 as the light sources to form the lower beam light distribution pattern PL, which has the cut-off lines CL1, CL2 at the upper end portion thereof, and the additional upper beam forming light distribution pattern PA, which spreads on the upper side of the cut-off lines, while enhancing the utilization factor of a bundle of rays of light from the light emitting devices 32, 42. Therefore, the vehicular illumination lamp 10 can be suitable for a lamp unit for a headlamp.

Moreover, according to the exemplary embodiment of the invention, the aforesaid functions and advantages can be obtained while sufficiently increasing the number of possible configurations and arrangements of the secondary light source unit 16. In addition, since the primary light emitting device 32 and the secondary light emitting device 42 can be disposed at positions which are sufficiently apart from each other, the heat dissipating properties of the lamp can be enhanced.

In addition, in the embodiment of the invention, since the downwardly oriented reflecting surface 46*a* of the secondary mirror member 46 is made up of a plane, which extends downwards at the angle of about 45° relative to the horizontal plane containing the optical axis Ax, the number of possibilities for the arrangement of the secondary light source unit 16 can be increased within a range where reflected light from the secondary mirror member 46 can be incident on the projection lens 12.

Furthermore, in the exemplary embodiment of the invention, since the primary mirror member 36 and the secondary mirror member 46 are formed integrally with each other as the light source unit 24, the accuracy at which the primary mirror member 36 and the secondary mirror member 46 are positioned relative to each other can be enhanced. Therefore, the additional upper beam forming light distribution pattern PA that is formed by turning on the secondary light source unit 16 can be formed, with good accuracy, into the predetermined positional relationship relative to the lower beam light distribution pattern that is formed by turning on the primary light source unit 14. Furthermore, since the primary mirror member 36 and the secondary mirror member 46 are formed integrally, the size and number of components involved in the vehicular illumination lamp 10 can be reduced.

In the embodiment, the primary and secondary light source units 14, 16 maybe made up of light transmitting blocks so as to make use of internal reflections appropriately. By adopting such a configuration, the vehicular illumination lamp 10 can be made compact in size. As this occurs, these primary and secondary light source units 14, 16 can be made up of a single light transmitting block or separate light transmitting blocks.

Next, modifications to the exemplary embodiment will be described.

Figure 7:
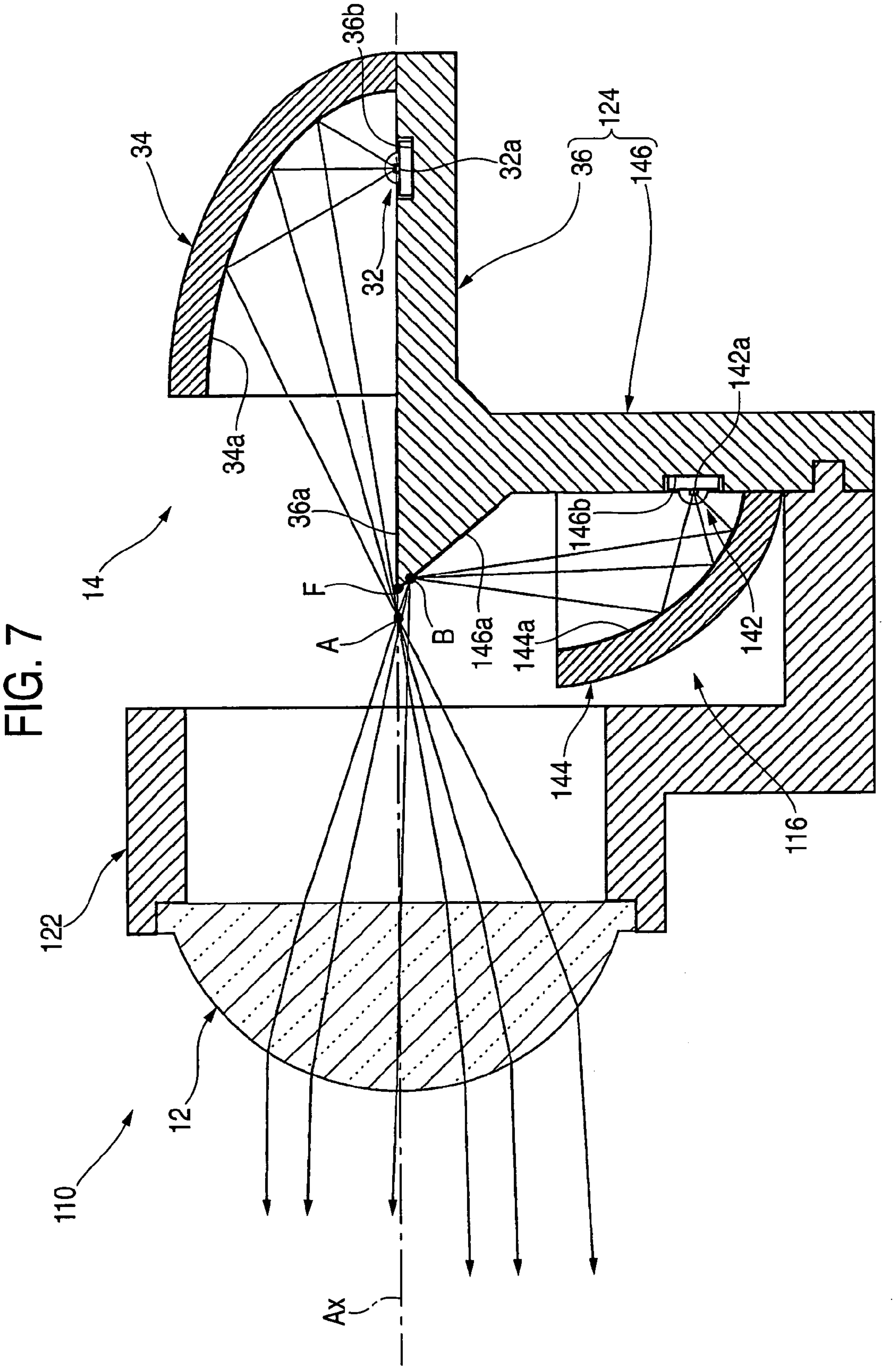
FIG. 7 is a drawing similar to FIG. 1, which shows a vehicular illumination lamp according to a first modification to the exemplary embodiment.

Firstly, a first modification to the exemplary embodiment will be described. FIG. 7, which is a similar diagram to FIG. 1, shows a vehicular illumination lamp 110 according to this modification.

As shown in FIG. 7, this vehicular illumination lamp 110 is similar to the vehicular illumination lamp 10 in the embodiment in that a projection lens 12 and a first light source unit 14 have similar configurations to those of their counterparts in the exemplary embodiment. However, the first modification is different in that a second light source unit 116 has a different configuration from that of its counterpart in the exemplary embodiment.

Similar to the second light source unit 16 in the exemplary embodiment, the second light source unit 116 includes a second mirror member 146 having a downwardly oriented reflecting surface 146*a*, which extends obliquely downwards from the front end edge of the upwardly oriented reflecting surface 36*a* of the primary mirror member 36 towards the lamp, a secondary light emitting device 142 disposed below an optical axis Ax, and a secondary reflector 144 adapted to reflect upwards light from the secondary light emitting device 142 so as to cause the light so reflected to substantially converge on a point B on the downwardly oriented reflecting surface 146*a*, which lies slightly obliquely below and further rearwards than a rear focal point F. The secondary mirror member 146 is made to constitute part of a light source unit holder 124.

The configuration of the secondary light emitting device 142 is similar to that of a primary light emitting device 32 and is fixedly positioned in a light source support recess portion 146*b* formed in a vertical plane which extends downwards from a lower end edge of the downwardly oriented reflecting surface 146*a* of the secondary mirror member 146 in such a state that a light emitting chip 142*a* thereof is disposed in such a manner as to be oriented forwards at a position lying slightly obliquely below and further rearwards to the rear of the lamp than the rear focal point F.

A reflecting surface 144*a* of the secondary reflector 144 is made up of a substantially ellipsoidal surface which has a major axis on a straight line which connects a light emitting center of the secondary light emitting device 142 with the-point B and takes the light emitting center of the secondary light emitting device 142 as a primary focal point. In this case, this reflecting surface 144*a* is set such that a vertical sectional shape thereof, which extends along the major axis thereof, becomes an elliptic shape which takes the point B as a secondary focal point and is also set such that the eccentricity thereof gradually increases from a vertical section towards the left and right thereof, whereby the secondary reflector 144 is made not only to cause light from the secondary light emitting device 142 to converge on the point B with respect to a longitudinal direction but also to reduce the degree of convergence with respect to a horizontal direction. This secondary reflector 144 is fixed to the vertical plane of the secondary mirror member 146 at a rear end portion of a circumferential edge of the reflecting surface 144*a*.

The downwardly oriented reflecting surface 146*a* of the secondary mirror member 146 is made up of a plane which is inclined through an angle of about 50° relative to a horizontal plane containing the optical axis Ax, whereby the secondary mirror member 146 is made to reflect forwards most of reflected light from the reflecting surface 144*a* of the secondary reflector 144 on the downwardly oriented reflecting surface 146*a* thereof so as to cause the light so reflected to be incident on the projection lens 12.

Note that while a lens holder 122 of this modification is also fixedly connected to the light source unit holder 124. In order to secure a space where the secondary reflector 144 is to be provided, the shape thereof is made to be partly different from that of the lens holder 22 in the exemplary embodiment.

Also when adopting the configuration of the first modification, light from the secondary light emitting device 142 disposed below the optical axis Ax can be reflected upwards by the secondary reflector 144 so as to cause the light so reflected to substantially converge on the point B on the downwardly oriented reflecting surface 146*a* of the secondary mirror member 146 which lies near the rear focal point F of the projection lens 12, so that the reflected light from the downwardly oriented reflecting surface 146*a* can be passed through a rear focal plane of the projection lens 12 at a position below and near the rear focal point F of the projection lens, whereby much of light from the secondary light emitting device 142 can be made to be incident on the projection lens 12 with good efficiency. Therefore, the same functions and advantages as the exemplary embodiment can be obtained by this configuration.

Figure 8:
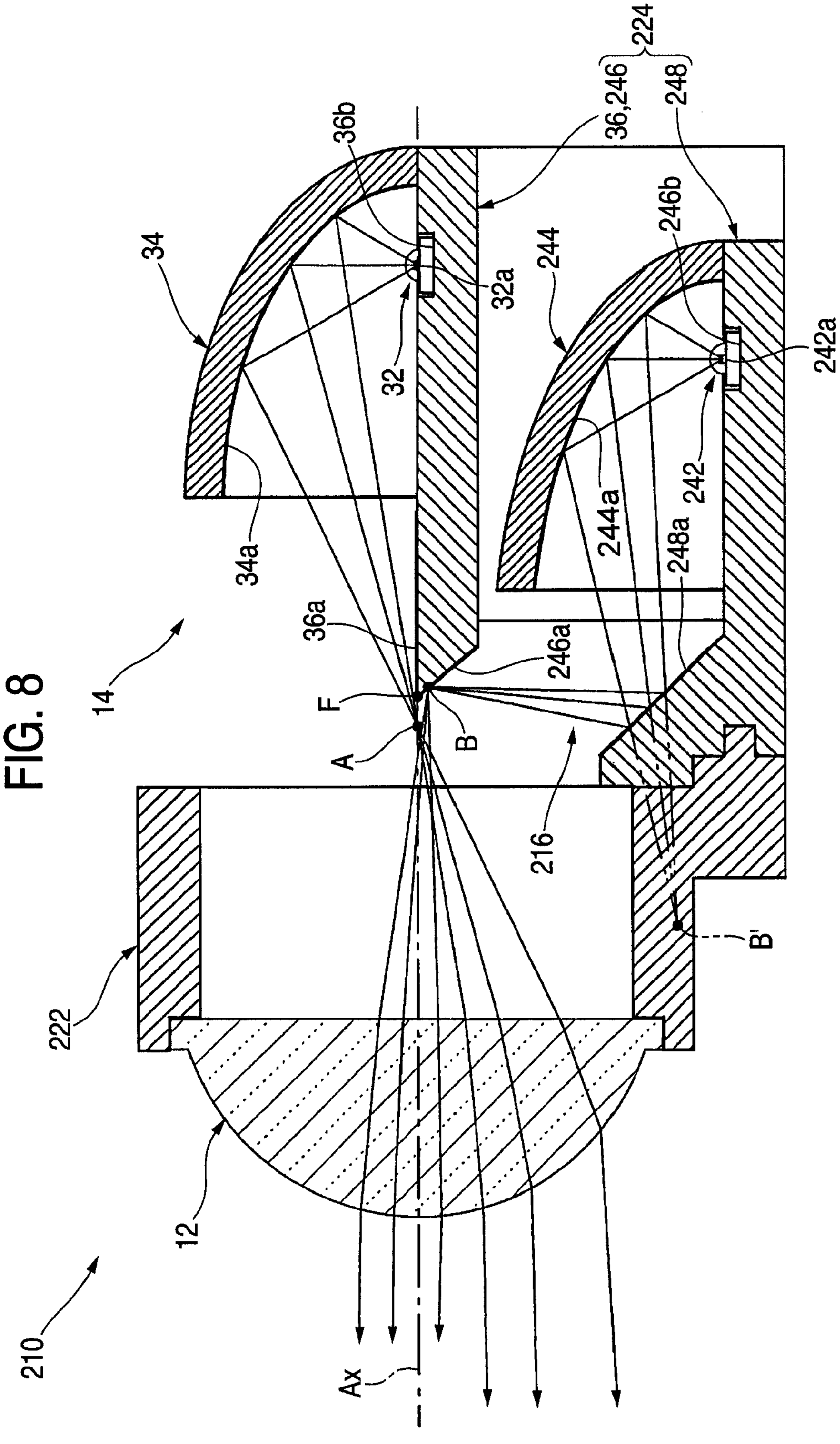
FIG. 8 is a drawing similar to FIG. 1, which shows a vehicular illumination lamp according to a second modification to the exemplary embodiment.

Next, a second modification to the embodiment will be described. FIG. 8, which is a similar diagram to FIG. 1, shows a vehicular illumination lamp 210 according to this modification.

As shown in FIG. 8, this vehicular illumination lamp 210 is similar to the vehicular illumination lamp 10 in the exemplary embodiment in that a projection lens 12 and a first light source unit 14 have similar configurations to those of their counterparts in the exemplary embodiment but is different in that a second light source unit 216 has a different configuration from that of its counterpart in the exemplary embodiment.

Similar to the second light source unit 16 in the exemplary embodiment, the second light source unit 216 includes a second mirror member 246 having a downwardly oriented reflecting surface 246*a*, which extends obliquely downwards from the front end edge of the upwardly oriented reflecting surface 36*a* of the primary mirror member 36 towards the lamp, a secondary light emitting device 242 disposed below an optical axis Ax, and a secondary reflector 244 adapted to reflect upwards light from the secondary light emitting device 242 via an upwardly oriented reflecting surface 248*a* of a tertiary mirror member 248 so as to cause the light so reflected to substantially converge on a point B on the downwardly oriented reflecting surface 246*a*, which lies slightly obliquely below and further rearwards than a rear focal point F.

In this case, the secondary mirror member 246 is made as part of a member, which also incorporates therein a first mirror member 36, and the tertiary mirror member 248 is disposed below and in parallel with the primary mirror member 36. Then, these primary, secondary and tertiary mirror members 36, 246, 248 are made to constitute part of a light source unit holder 224.

The configuration of the secondary light emitting device is similar to that of a primary light emitting device 32 and is fixedly positioned in a light source support recess portion 246*b* formed on an upper surface of the tertiary mirror member 248 in such a state that a light emitting chip 242*a* thereof is disposed in such a manner as to be oriented upwards at a position, which lies slightly obliquely below and further rearwards than a rear focal point F.

The downwardly oriented reflecting surface 248*a* of the tertiary mirror member 248 is situated below the downwardly oriented reflecting surface 246*a* of the secondary mirror member 246 and is made up of a plane, which is inclined through an angle of on the order of 45° relative to a horizontal plane containing the optical axis Ax.

A reflecting surface 244*a* of the secondary reflector 244 is made up of a substantially ellipsoidal surface, which has a major axis on a straight line which connects a light emitting center of the secondary light emitting device 242 with a point B', which has a symmetrical positional relationship with the point B relative to the upwardly oriented reflecting surface 248*a* of the tertiary mirror member 248, and the light emitting center of the secondary light emitting device 242 as a primary focal point of the reflecting surface 244*a* of the secondary reflector 244. In this case, this reflecting surface 244*a* is set such that a vertical sectional shape thereof, which extends along the major axis, becomes an elliptic shape which takes the point B' as a secondary focal point and is also set such that the eccentricity thereof gradually increases from a vertical section towards the left and right thereof. Therefore, the secondary reflector 244 is made not only to cause light from the secondary light emitting device 242 to converge on the point B with respect to a longitudinal direction but also to reduce the degree of convergence with respect to a horizontal direction. This secondary reflector 244 is fixed to an upper surface of the tertiary mirror member 248 at a rear end portion of a circumferential edge of the reflecting surface 244*a* thereof.

The downwardly oriented reflecting surface 246*a* of the secondary mirror member 246 is made up of a plane which is inclined through an angle of about 50° relative to a horizontal plane containing the optical axis Ax, whereby the secondary mirror member 246 is made to reflect forwards most of light from the upwardly oriented reflecting surface 248*a* of the tertiary mirror member 248 on the downwardly oriented reflecting surface 246*a* thereof so as to cause the light so reflected to be incident on the projection lens 12.

Note that while a lens holder 222 of this second modification is also fixedly connected to the light source unit holder 224, the shape thereof partly different from that in the exemplary embodiment in order to cope with the configuration of the secondary light source unit 216.

Also in the event that the configuration of this modification is adopted, light from the secondary light emitting device 242 disposed below the optical axis Ax is reflected upwards by the secondary reflector 244 via the tertiary mirror member 248 so as to cause the light so reflected to substantially converge on the point B on the downwardly oriented reflecting surface 246*a* of the secondary mirror member 246 which lies near the rear focal point F of the projection lens 12. Therefore, reflected light from the downwardly oriented reflecting surface 246*a* can be passed through a rear focal plane of the projection lens 12 at a position lying below and near the rear focal point F of the projection lens 12, whereby much of light from the secondary light emitting device 242 can be made to be incident on the projection lens 12 with good efficiency. Therefore, the same functions and advantages of the exemplary embodiment can be obtained by this configuration.

While the invention has been described with reference to the exemplary embodiment and modifications thereof, the technical scope of the invention is not restricted to the description of the exemplary embodiment and modifications thereof. It is apparent to the skilled in the art that various changes or improvements can be made. It is apparent from the description of claims that the changed or improved configurations can also be included in the technical scope of the invention.

What is claimed is:

1. A vehicular illumination lamp, comprising:

a projection lens disposed on an optical axis, the optical axis extends in a longitudinal direction of the lamp, a primary light source unit, and a secondary light source unit, said primary and secondary light source units disposed rearwards of the projection lens, wherein the primary light source unit comprises:

a primary light emitting device disposed near the optical axis at a position situated further rearwards than a rear focal point of the projection lens, a primary reflector disposed in such a manner as to cover the primary light emitting device from above so as to reflect light from the primary light emitting device towards a front of the lamp and towards the optical axis, and a primary mirror member having an upwardly oriented reflecting surface, which extends rearwards from near the rear focal point of the projecting lens substantially along the optical axis so as to reflect part of reflected light from the primary reflector upwards, and wherein the secondary light source unit comprises:

a secondary mirror member having a downwardly oriented reflecting surface, which extends obliquely downwardly from a front end edge of the upwardly oriented reflecting surface towards a rear of the lamp, a secondary light emitting device disposed below the optical axis, and a secondary reflector that reflects light from the secondary light emitting device upwards so that the light substantially converges on a location on the downwardly oriented reflecting surface, which lies slightly obliquely below and near the rear focal point of the projecting lens;

wherein the primary reflector comprises a substantially ellipsoidal surface, and the primary reflector has, in its vertical section, an elliptic shape that includes a primary focal point provided at the vicinity of the primary light emitting device and a secondary focal point provided slightly further forward than the rear focal point of said projection lens.

2. The vehicular illumination lamp as set forth in claim 1, wherein the downwardly oriented reflecting surface comprises a flat plane, which extends downwards at an angle of 30° to 60° relative to a horizontal plane.

3. The vehicular illumination lamp as set forth in claim 2, wherein the primary mirror member and the secondary mirror member are formed integrally with each other.

4. The vehicular illumination lamp as set forth in claim 2, wherein the secondary reflector comprises a substantially ellipsoidal surface including the secondary light emitting device as a primary focal point thereof.

5. The vehicular illumination lamp as set forth in claim 1, wherein the primary mirror member and the secondary mirror member are formed integrally with each other.

6. The vehicular illumination lamp as set forth in claim 1, wherein the secondary reflector comprises a substantially ellipsoidal surface including the secondary light emitting device as a primary focal point thereof.

* * * * *